United States Patent
Duarte et al.

(10) Patent No.: US 9,059,828 B1
(45) Date of Patent: Jun. 16, 2015

(54) FULL SEARCH MIMO DETECTOR FOR RECOVERING SINGLE OR MULTIPLE DATA STREAM IN A MULTIPLE ANTENNA RECEIVER

(71) Applicants: Jose Marcelo Lima Duarte, Salvador (BR); Shue Lee Chang, San Jose, CA (US); Wee Peng Goh, Temecula, CA (US)

(72) Inventors: Jose Marcelo Lima Duarte, Salvador (BR); Shue Lee Chang, San Jose, CA (US); Wee Peng Goh, Temecula, CA (US)

( * ) Notice: Subject to any disclaimer, the term of this patent is extended or adjusted under 35 U.S.C. 154(b) by 0 days.

(21) Appl. No.: 13/897,447

(22) Filed: May 20, 2013

Related U.S. Application Data

(60) Provisional application No. 61/650,594, filed on May 23, 2012.

(51) Int. Cl.
    *H04L 27/06*    (2006.01)
    *H04L 1/00*     (2006.01)

(52) U.S. Cl.
    CPC ........................... *H04L 1/0054* (2013.01)

(58) Field of Classification Search
    CPC ............ H04L 25/03203; H04L 1/0054; H04L 25/03171; H04L 25/067; H04L 25/03324; H04L 25/03337

USPC ................ 375/260, 262, 265, 267, 340–341, 375/346–350; 714/794, 795, 796
See application file for complete search history.

(56) References Cited

U.S. PATENT DOCUMENTS

| | | | | |
|---|---|---|---|---|
| 7,746,951 | B2 * | 6/2010 | Hwang et al. | 375/267 |
| 2007/0230608 | A1 * | 10/2007 | Li | 375/267 |
| 2008/0144746 | A1 * | 6/2008 | Waters et al. | 375/340 |
| 2009/0196360 | A1 * | 8/2009 | Gan et al. | 375/260 |
| 2012/0134451 | A1 * | 5/2012 | Patel et al. | 375/341 |

\* cited by examiner

*Primary Examiner* — Khanh C Tran

(57) ABSTRACT

This invention discloses an optimum form maximum likelihood MIMO detector (SFS ML Detector) that computes the LLR of the most likely received bit sequence from the received signal y, which consist of multiple signal stream from a MIMO channel H and an estimate of H. Through 5 simple steps of QR factorization, computation of partial Euclidean distance, sorting of the partial Euclidean distance, selection of surviving hypothesis by a set of algorithmic rule and computation of the full Euclidean distance of the survivors, and computation of the maximum likelihood from the surviving full Euclidean distance, the LLR of the received bit sequence can be obtained with a significantly lower number of computation and comparison than that is implied in the theoretical form of the maximum likelihood (ML) detector. There is no loss in performance of the SFS ML detector from the theoretical ML detector.

6 Claims, 5 Drawing Sheets

| If | $s_z \geq 0$ | $s_z < 0$ |
|---|---|---|
| $|s_z| > 2$ | [3 1 -1 -3] | [-3 -1 1 3] |
| $2 \geq |s_z| > 1$ | [1 3 -1 -3] | [-1 -3 1 3] |
| $1 \geq |s_z|$ | [1 -1 3 -3] | [-1 1 -3 3] |

| If | $s_z \geq 0$ | $s_z < 0$ |
|---|---|---|
| $|s_z| > 6$ | [7 5 3 1 -1 -3 -5 -7] | [-7 -5 -3 -1 1 3 5 7] |
| $6 \geq |s_z| > 5$ | [5 7 3 1 -1 -3 -5 -7] | [-5 -7 -3 -1 1 3 5 7] |
| $5 \geq |s_z| > 4$ | [5 3 7 1 -1 -3 -5 -7] | [-5 -3 -7 -1 1 3 5 7] |
| $4 \geq |s_z| > 3$ | [3 5 1 7 -1 -3 -5 -7] | [-3 -5 -1 -7 1 3 5 7] |
| $3 \geq |s_z| > 2$ | [3 1 5 -1 7 -3 -5 -7] | [-3 -1 -5 1 -7 3 5 7] |
| $2 \geq |s_z| > 1$ | [1 3 -1 5 -3 7 -5 -7] | [-1 -3 1 -5 3 -7 5 7] |
| $1 \geq |s_z|$ | [1 -1 3 -3 5 -7 7 -7] | [-1 1 -3 3 -5 5 -7 7] |

| $e_{r1}^2$ | $x_1\ x_2$ | $s_{1r}$ | | $s_{1i}$ | $x_3\ x_4$ | $e_{i1}^2$ |
|---|---|---|---|---|---|---|
| min | 1 0 | −1 | 131 | +3 | 0 1 | min |
| | 0 0 | +1 | 134 | +5 | 0 0 | |
| | 0 1 | +3 | 132 / 135 | +1 | 1 0 | |
| | | | 133 | | | |
| max | 1 1 | −3 | | +7 | 1 1 | max |

FULL SEARCH MIMO DETECTOR FOR RECOVERING SINGLE OR MULTIPLE DATA STREAM IN A MULTIPLE ANTENNA RECEIVER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

STATEMENT OF NO NEW MATTER

This substitute specification contains no new matter.

PRIOR ART

Recent wireless communication systems such as WiMax and LTE uses multiple antenna to transmit and receive parallel data transmission in the same frequency band in order to achieve a high data rate. The cost of this parallel transmission is an increase in the complexity of the receiver, which needs to detect the independent data sent simultaneously from the received vector. Most often, a soft-output MIMO detector identifies the most likley transmit data sequence by computing error distances (ED) between all possible transmit data sequences and the received signal. A direct computation of error distances of all possible transmit data sequences requires $2^{N_t M}$ computation of error distances, where $N_t$ is the number of transmit antenna and M is the number of tansmit bits that map one constellation symbol. Furthermore, to identify each bit in the data sequence, a total of $(N_t M)\cdot 2^{N_t M}$ comparisons are needed. In the case of a 2×2 64QAM system for example, 4096 error distances and 49,152 comparisons are needed to decode the 12 transmitted bits. This computation effort makes a direct computation non-viable for practical solutions in high bandwidth system.

Many soft-output sphere detector have been proposed to achieve performance close to the direct computation (full search) method with a significant complexity reduction. Patel et al., "Method and system for a low-complexity soft-output MIMO detection", US 2012/0134451 describes a method to select K-best error distances in decoding the received signal. However, such algorithm would result in performance loss as the selection process eliminates some less likely data sequences early in the process. In some cases, one of these less likely data sequences turns out to be necessary to identify one or more bits of the transmit data sequence. Thus early elimination inevitably result in performance loss. The number of ED computation in the K-best approach is given by the equation $K\sqrt{Q}$, where Q is the number of constellation symbols. Thus the ED computation is dependent on selected K path. As will be shown in the technical details, our present invention ED computation is $$2^{(N_t-1)Q}(2^{\sqrt{Q}/2}+1)$$

which is different from Patel's and also not dependent on any assumption of path selection. Further, our present invention results in no loss of performance compare to direct compuation of all paths. It is not clear in the Patel's patent if there is any performance loss when compared to the direct compuation case.

Similarly, for the patent U.S. Pat. No. 7,746,951, Hwang et al., "Log-likelihood ratio (LLR) generating apparatus and method in Multiple Input Multiple Output (MIMO) antenna communication system", performance is trade-off by considering a subset of the transmit vectors and assignment of weights to minimize the loss. In Gan et al., "Lattice-reduction-aided MIMO detector", the selection of transmit vector for detection consideration is done iterative to reach certain performance target. The approach is different from our invention. US-2008/0144746, Waters et al., again uses an iterative approach as stated in the patent summary and quoted herein, "During a first search mode, the parameterized sphere detector enumerates a number of best candidate vectors up to a fixed parameter value. During a second search mode, the parameterized sphere detector enumerates additional candidate vectors using a greedy search until a predetermined number of candidate vectors have been enumerated". This again is fundamentally different from our invention. Patent US-2007/0230608 by Li, Guangjie et al., again uses some selection criteria to minimize the number of path used in the detection process. However, the selection process is fundamentally different from our invention and according to the patent disclosure as quoted here in, "the performance of the method of an embodiment is only approximately 1.3 dB less than the brutal ML MIMO detection at a BER of 10-3.", which leads to significant loss compare to the brutal approach (direct computation of all paths).

As described in the detail technical section of this patent, our present invention uses a path selection approach that resulted in no loss of performance comparing to the direct computation of all paths, and yet the number of computation is significantly reduced and comparable with other lossy approaches as mention above.

TECHNICAL FIELD

The present invention is in the technical field of multiple input and multiple output (MIMO) wireless/cellular/wireline communication and in particular in improving the MIMO detection capability of a network access point, a base station or a user equipment (UE) and related devices.

BACKGROUND OF THE INVENTION

Recently, the 3$^{rd}$ Generation Partnership Project (3GPP) has adopted a set of standards for cellular network known as LTE or 3GPP release 8 which uses transmitter and receiver, each having multiple antennas for transmission and reception of data. As a multiple input, multiple output (MIMO) technology, LTE is designed to coordinate multiple simultaneous radio signals, and is expected to support a bit rate of greater than 100 megabits per second (Mbps). Furthermore, the Institute of Electrical and Electronics Engineers (IEEE) has adopted an 802.16m standard, which supports the International Telecommunication Union (ITU) IMT-ADVANCE (also known as "4G") and an 802.11n standards for wireless local area network. Both standards also use MIMO technology for throughput and/or performance enhancement. Further work in MIMO technology in the form of LTE-advanced is also initiated in 3GPP.

MIMO techniques may be in the form of single-user MIMO, or SU-MIMO, which involves communications between a single base station (BS) or an access point (AP), and a single mobile station (MS), user premise equipment (UE), or subscriber station (SS). During the uplink, a MS may transmit multiple independent signal streams to the BS using the same transmission channel. In the downlink, the BS may transmit multiple independent signal streams to the MS. Multiple-user MIMO, or MU-MIMO, is concerned with communication between the BS and multiple MSs or SSs. During the uplink, multiple MSs transmit data to the BS in the same transmission channel; during the downlink, the BS transmits signals to multiple MSs in the same transmission channel. MIMO technology takes advantage of spatial multiplexing, that is signals sharing the same transmission channel but uses different signal propagation paths, or time multiplexing, that is signals sharing the same transmission channel at different time, or a combination of spatial and time multiplexing, to achieve higher throughput or performance enhancement. The recovery of the multiplexed signal streams in the receiver requires special MIMO detector to de-multiplex the composite signals stream into its independent constituents and hence recovering the original transmitted signal streams.

SUMMARY OF THE INVENTION

The present invention describes an optimized MIMO detector that is applicable to the recovery of the data from the signal streams that is transmitted using all these multiplexing methods.

DETAILED DESCRIPTION OF THE INVENTION

In the following detailed description, only certain exemplary embodiments of the present invention has been shown and described for purpose of illustration. As those skilled in the art would realize, the described embodiments may be modified in various different ways, all without departure from the essence of the present invention. Accordingly, the drawings and description are to be regarded as illustrative in nature and not restrictive. The term module here refers to one module that processes a specific function or operation that can be implemented by hardware or software.

Figure 8:
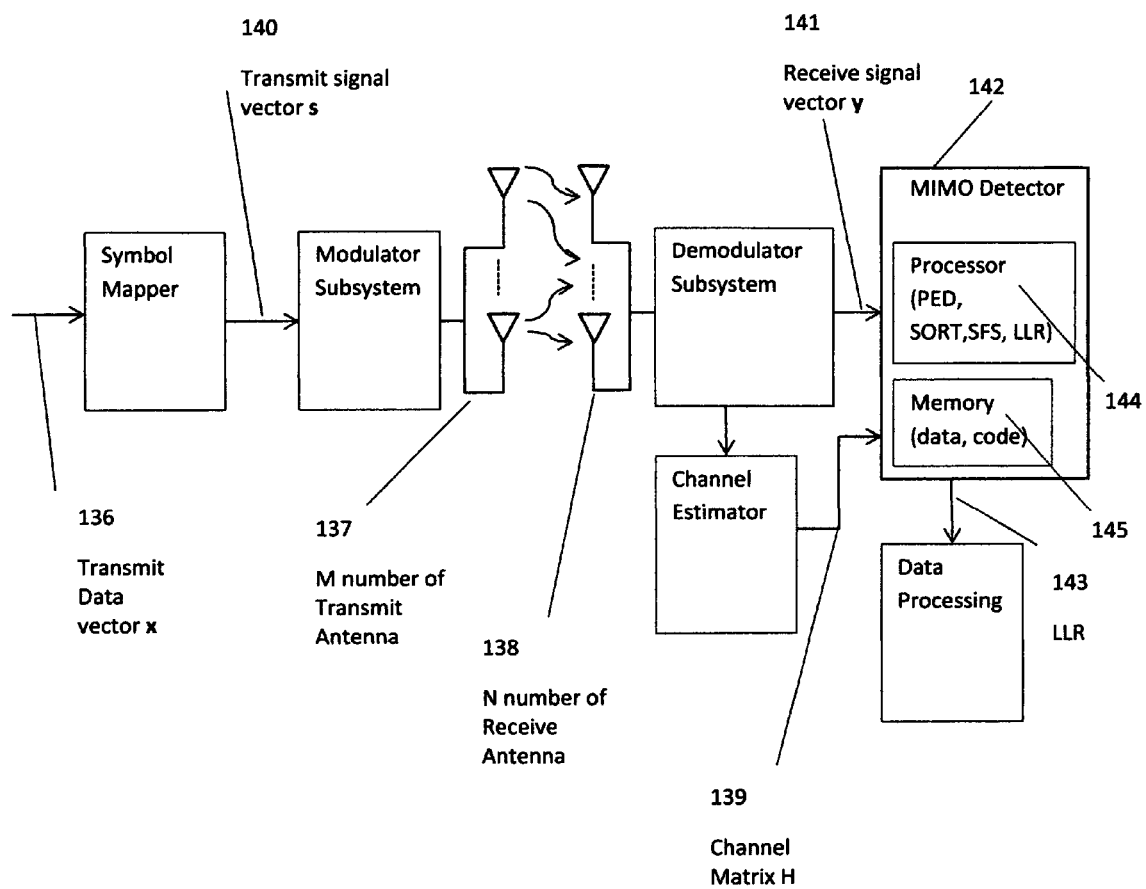
FIG. 8 illustrates a MIMO communication system using a MIMO detector implemented with a processor executing the simplified full search algorithm and associated memory for data storage and execution code storage.

MIMO transmission from a BS may use M transmit antennas 137 as shown in FIG. 8. The transmitter may transmit different data streams on each transmit antenna using the same frequency channel. The receiver of the UE may receive the signal from the BS using N receive antennas 138. Hence, each transmit signal from a transmit antenna is received by N different receive antennas. Hence, the channel can be represented by a N×M matrix H 139. Equation (1) shows the relationship between the transmit and receive signals.

$$y = Hs + n \quad [1]$$

where $s=[s_1\ s_2\ \cdots\ s_M]$ is a vector representing the transmit signals 140, $y=[y_1\ y_2\ \cdots\ y_N]$ is a vector representing the received signals 141, H is the N×M complex channel matrix, and n is the N-dimensional complex Gaussian noise vector with variance $\sigma^2$. The transmit signals may be modulated using single carrier, OFDM or OFDMA with some type of digital modulation technique, such as QAM symbol. Any form of digital modulation is applicable to this invention. Hence, during one modulation symbol interval, M number of QAM symbols, one symbol for each antenna, will be simultaneously transmitted using the same carrier or sub-carrier frequency and is represented in equation [1] as the transmit signal vector s. Each element of the vector s is a transmit symbol which represents some binary information. For instance, a 64-QAM modulated symbol represents 6 binary bits of data 136 x per symbol. The received signal y and the channel matrix H can provide sufficient information to the MIMO detector 142 to derive the log likelihood ratio, LLR 143 which could be used to recover the original transmit data bit sequences. The MIMO detector can be implemented generally by logic circuits processor 144 that peforms data processing function on the received data stored in the memory element 145. Alternatively, the MIMO detector processing can be in the form of a software program running on a general purpose processor and memory elements.

The matrix H is such that $$H = \begin{bmatrix} h_{11} & h_{12} & \cdots & h_{1M} \\ h_{21} & h_{22} & \cdots & h_{2M} \\ \vdots & \vdots & \vdots & \vdots \\ h_{N1} & h_{N2} & \cdots & h_{NM} \end{bmatrix} \quad [2]$$

where the element $h_{nm}$ is a complex number that represents the gain and phase of the transmission path from m-th transmit antenna to the n-th receive antenna. Expanding the matrix equation described in equation [1], the element $y_1$ can be shown to be $$y_1 = h_{11}s_1 + h_{12}s_2 + \cdots + h_{1M}s_M + n_1$$

Likewise, for any row n, $$y_n = h_{n1}s_1 + h_{n2}s_2 + \cdots + h_{nM}s_M + n_n$$

The channel H may be estimated in the receiver through channel estimation using a known training sequence in the form of pilot symbols or any other means. For example, in LTE, pilot symbols are send from every transmit antenna on every $6^{th}$ symbol. The pilot symbols are used to estimate H.

The element $s_v$ in vector s is generated by a mapping function $s_v = map(x^{<v>})$, where $x^{<v>}$ is a 1×U bit vector that maps to one of $2^U$ constellation symbols. For instance, for 64-QAM, U=6. So, the total number of transmitted bits per realization of [1] is M×U. The total transmitted bit vector, defined as x, is obtained by concatenating the bits from $x^{<1>}$, $x^{<2>}$, ..., $x^{<M>}$. Hence, s=map(x) and x=demap(s). The bits of vector x will be designated as $x_1, x_2, \ldots, x_{MU}$, and each bit value are designated here as +1 or −1, instead of traditional 1 or 0.

To recover the binary information in x the log likelihood ratio (LLR), $L(x_k|y)$ for each transmitted bit, $x_k$, where $k=1, 2, \ldots, MU$, must be computed. The LLR is defined as $$L(x_k | y) = \ln \frac{P(x_k = +1 | y)}{P(x_k = -1 | y)} \quad [3]$$

where, $P(x_k=+1|y)$ and $P(x_k=-1|y)$ are the probability of $x_k=+1$ and $x_k=-1$ for a given value for y. The LLR provides a probabilistic measure of the reliability of the recovered information in the receiver. For instance, if the LLR of the bit $x_1$ is a large positive number, then there is a high probability that $x_1$ has a bit value of '+1'. Conversely, if the LLR of bit $x_1$ is a large negative number, then there is a high probability that $x_1$ has a bit value of '0'.

When there is no priori information about the probability of transmitted bits, equation [3] is equal to $$L(x_k | y) = \ln \frac{\sum_{x \in X_{k,+1}} \exp\left(-\frac{1}{2\sigma^2} \cdot \|y - H \cdot s\|^2\right)}{\sum_{x \in X_{k,-1}} \exp\left(-\frac{1}{2\sigma^2} \cdot \|y - H \cdot s\|^2\right)} \quad [4]$$

where $X_{k,+1}$ and $X_{k,-1}$ are the set of $2^{MU-1}$ hypothesis of x with $x_k=+1$ and $x_k=-1$, respectively. Equation [4] is known as the maximum likelihood (ML) detector. Practical systems simplified the ML calculation using one approximation of it, as the max-log approximation, $\ln(e^a+e^b) \approx \max(a,b)$, which leads to $$L(x_k | y) \approx \frac{1}{2\sigma^2}\left(\min_{x \in X_{k,-1}} d(s) - \min_{x \in X_{k,+1}} d(s)\right). \quad [5]$$

where, $d(s)=\|y-H \cdot s\|^2$ is the error distance (ED) of one particular s.

There are $2^{MU}$ ED to be pre-computed before evaluating equation [5] for any bit in x, and $2^{MU}$ ED comparisons are needed to evaluate Equation [5] for one specific bit in x due the min() functions. Thus, in total, $2^{MU}$ error distance and MU $2^{MU}$ comparisons are needed to compute the LLR of all bits in vector x through a direct computation of Equation [5]. This direct computation method is called the Full Search method since the ED requires that all hypotheses for x are used while processing the two min() function. In the case of a 2×2 64 QAM system for example, 4096 error distances and 49,152 comparisons are needed to decode the 12 transmitted bits. This computation effort makes direct computation a non-viable solution in high bandwidth system.

The present invention offers a low complexity algorithm to compute the ML. We called this algorithm the Simplified Full Search (SFS) algorithm as it results in the same output as the optimum form represented in [5] using a significantly less number of computation operation. For the exemplary system of 2×2 64-QAM, the SFS algorithm needs to compute only 576 ED and evaluate 3840 ED comparisons to get the ML solution for all bits in x. The SFS is also applicable to other optimum form of MIMO detectors.

The SFS algorithm reduces the number of pre-computed d(s) and the number of comparisons to find the max-log-ML of all bits in vector x by using a subset of $X_{k,-1}$ and $X_{k,-1}$ as shown below.

$$L(x_k | y) \approx \frac{1}{2\sigma^2}\left(\min_{x \in B_{k,-1} \subset X_{k,-1}} d(s) - \min_{x \in B_{k,+1} \subset X_{k,+1}} d(s)\right) \quad [6]$$

This leads to a smaller number of comparisons than Equation 5. The result of Equation [6] is equal to Equation [5] because the selected set $B_k = B_{k,-1} \cup B_{k,+1}$ obey the following properties.

$$\underset{x \in X_{k,-1}}{\mathrm{argmin}}(d(s)) \in B_k$$

$$\underset{x \in X_{k,+1}}{\mathrm{argmin}}(d(s)) \in B_k$$

which means that the vector x with bit $x_k=+1$ that minimize the d(s) function is in the set $B_k$, and the x with bit $x_k=-1$ that minimize the d(s) function is also in $B_k$. The set of all x vector which has its d(s) value pre-computed before Equation [6] evaluation is defined by the set $$B = \bigcup_{k=1}^{MU} B_k.$$

The reduction in the number of pre-computed d(s) is a consequence of $B \subset X$, where X is the set of all possible vector x. The SFS core idea resides in the method to find the sets $B_1, B_2, \ldots, B_{MU}$ that allows the reduction in the number of computed d(s) and in the number of comparison to find the solution for Equation [5].

Although this invention is applicable to any N×M H, the specific case of M=N is used for the following detailed explanation.

Figure 1:
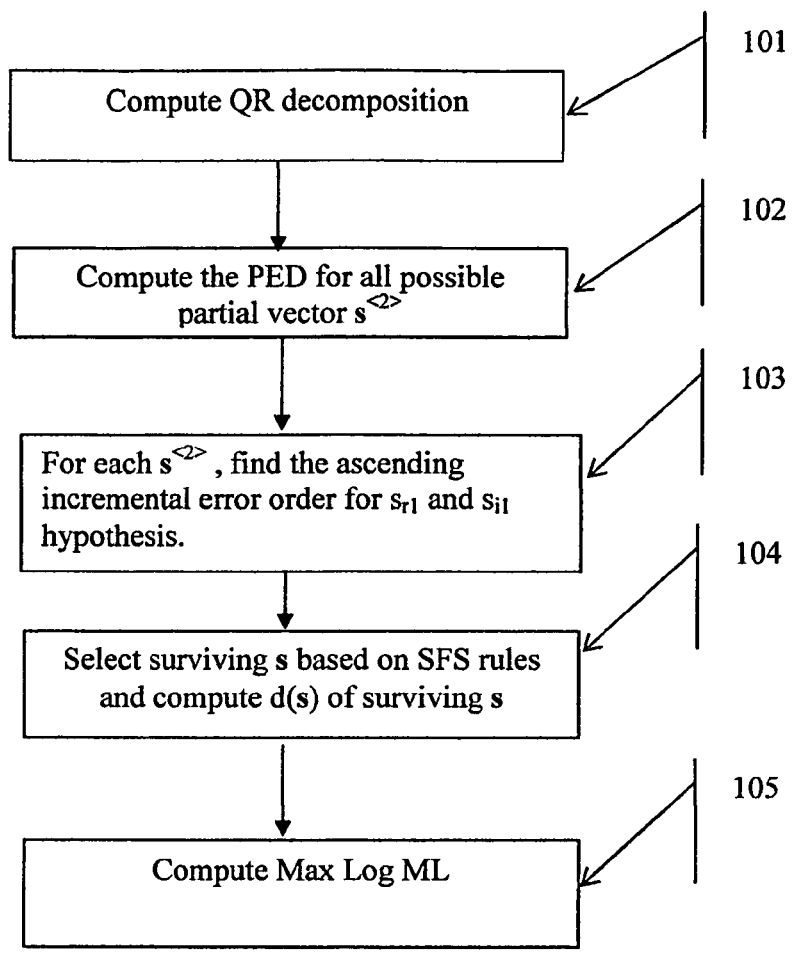
FIG. 1 shows the algorithm flow chart for this invention.

As shown in FIG. 1, the first step (step 101) of the SFS is to simplify Equation [1] by computing the QR decomposition (QRD) of matrix H, i.e. H=QR, and multiplying both side of equation by Q*. The matrix R that results from the QRD is upper triangular, Q is unitary, and Q* is the conjugate transpose of matrix Q.

Thus equation [1] becomes $$Q^*y = Q^*(QR)s + Q^*n$$

Setting $z=Q^*y$ and $v=Q^*n$, becomes $$z = Rs + v$$

Because Q* is also unitary, this transformation does not affect the original SNR, $\|v\|=\|Q^*n\|$.

There are multiple solutions for the QRD. SFS algorithm requires a solution where the diagonal of the matrix R is composed by real values only. Thus, the matrix R will have the form $$R = \begin{bmatrix} a_{11} & a_{12}+jb_{12} & \because & a_{1N}+jb_{1N} \\ 0 & a_{22} & \because & a_{2N}+jb_{2N} & \vdots \\ \because & \because & & \because & \because \\ 0 & 0 & & \because & a_{NN} \end{bmatrix} \quad [7]$$

The squared Error Distance (ED) for a vector s can be written as $$d(s) = \|z - Rs\|^2 \quad [8]$$

$$d(s) = \left\| \begin{bmatrix} z_1 \\ z_2 \\ \vdots \\ z_N \end{bmatrix} - \begin{bmatrix} a_{11} & a_{12}+jb_{12} & :: & a_{1N}+jb_{1N} \\ 0 & a_{22} & :: & a_{2N}+jb_{2N} \\ :: & :: & & :: \\ 0 & 0 & :: & a_{NN} \end{bmatrix} \begin{bmatrix} s_1 \\ s_2 \\ \vdots \\ s_N \end{bmatrix} \right\|^2$$

A complex-valued tree structure can be used to visualize the row-by-row computation of Equation 8 starting from the N-th row (k=N) to the first row (k=1) for all possible s. The tree has N+1 levels, each level is composed by nodes, and each node is uniquely identified by a partial symbol vector $s^{<k>}=[s_k \ s_{k+1} \ ::: \ s_N]$, where k is the level to which the node belongs. Each node in level k+1 generates $2^U$ nodes at level k. A line, named branch, connects a parent node to its children nodes. The initial node is the empty vector $s^{<N+1>}=[\ ]$, while the final nodes, also named leafs, are the ones in level k=1, and represent complete s vectors. Each node has an associated Partial Euclidean Distance (PED) $T(s^{<k>})$. The PED of the initial node is $T(s^{<N+1>})=0$, while subsequent nodes PED are given by:

$$T(s^{<k>}) = T(s^{<k+1>}) + \|e_k(s^{<k>})\|^2 \quad [9]$$

$$\|e_k(s^{<k>})\|^2 = \|u_k(s^{<k+1>}) - a_{kk} s_k\|^2 \quad [10]$$

$$u_k(s^{<k+1>}) = z_k - \sum_{m=k+1}^{M} (a_{km} + jb_{km})s_m \quad [11]$$

where $\|e_k(s^{<k>})\|^2$ is the incremental distance due to the transition from parent node $s^{<k+1>}$ to its children nodes $s^{<k>}$. The incremental distance can be rearranged to separate the influence of $s_k$ from previously computed $s^{<k+1>}$, as done in equation [10]. Note that $d(s)=T(s^{<1>})$. Computation of $T(s^{<k>})$ starts from k=n to k=2.

As shown in FIG. 1, the second step (step 102), is to compute $T(s^{<2>})$ for all possible partial symbol vector $s^{<2>}$. This, requires the complex computation of all $\|e_k(s^{<k>})\|^2$ for k=n to 2, which in any practical implementation, will have to be computed in real numbers. An equivalent representation of equation [10] and [11] in real number is as follows:

$$\|e_k(s^{<k>})\|^2 = e_{rk}^2 + e_{ik}^2 \quad [12]$$

$$e_{rk}(s^{<k+1>}, s_{rk}) = u_{rk}(s^{<k+1>}) - a_{k,k} \cdot s_{rk}$$

$$e_{ik}(s^{<k+1>}, s_{ik}) = u_{ik}(s^{<k+1>}) - a_{k,k} \cdot s_{ik}$$

$$u_{rk}(s^{<k+1>}) = z_{rk} - \sum_{m=k+1}^{M} (a_{km} \cdot s_{rm} - b_{km} \cdot s_{im})$$

$$u_{ik}(s^{<k+1>}) = z_{ik} - \sum_{m=k+1}^{M} (a_{km} \cdot s_{im} + b_{km} \cdot s_{rm})$$

Figure 2:
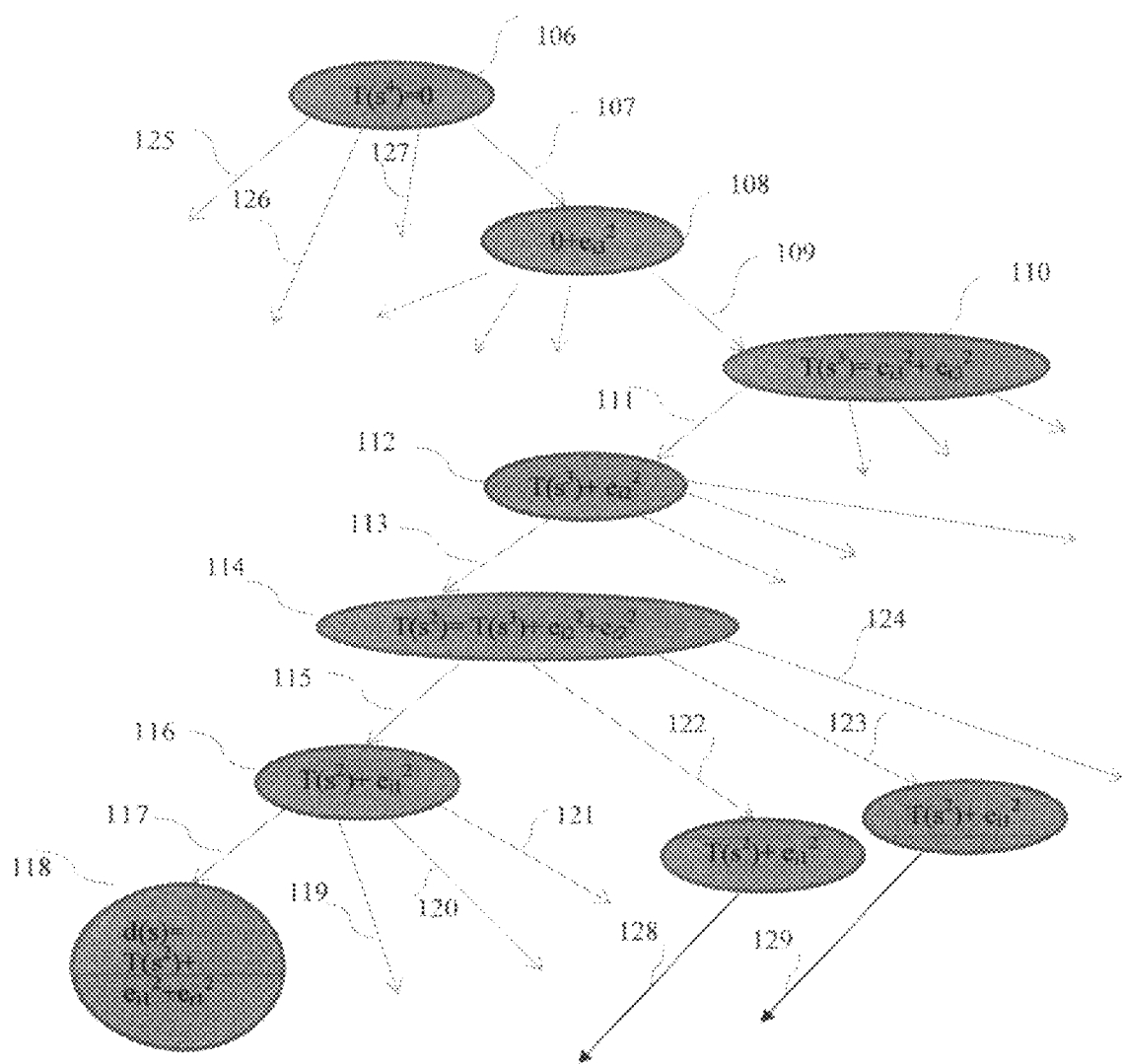
FIG. 2 shows a tree structure illustrating a search-tree for a 3×3 16QAM.

$s_{rk}$=Real part of $s_k$
$s_{ik}$=Imaginary part of $s_k$
$e_{rk}$=Real part of $e_k(s^{<k>})$
$e_{ik}$=Imaginary part of $e_k(s^{<k>})$
$u_{rk}$=Real part of $u_k(s^{<k+1>})$
$u_{ik}$=Imaginary part of $u_k(s^{<k+1>})$ As an example for illustrating step 102, FIG. 2 shows a real-valued tree structure of a 3 transmit antenna and 3 receive antenna MIMO system where the transmit symbol uses 16-QAM modulation, where each modulated symbol is represented by one of the discrete amplitude level $\{-3,-1,1,3\}$ on the I channel and one of the discrete amplitude level $\{-3,-1,1,3\}$ on the Q channel. The 16-QAM modulation would carry 2 bits on the real channel and 2 bits on the imaginary channel.

$$d(s) = \left\| \begin{bmatrix} \Re e(z_1) \\ \Im m(z_1) \\ \Re e(z_2) \\ \Im m(z_2) \\ \Re e(z_3) \\ \Im m(z_3) \end{bmatrix} - \begin{bmatrix} a_{11} & 0 & a_{12} & -b_{12} & a_{13} & -b_{13} \\ 0 & a_{11} & b_{12} & a_{12} & b_{13} & a_{13} \\ 0 & 0 & a_{22} & 0 & a_{23} & -b_{23} \\ 0 & 0 & 0 & a_{22} & b_{23} & a_{23} \\ 0 & 0 & 0 & 0 & a_{33} & 0 \\ 0 & 0 & 0 & 0 & 0 & a_{33} \end{bmatrix} \begin{bmatrix} \Re e(s_1) \\ \Im m(s_1) \\ \Re e(s_2) \\ \Im m(s_2) \\ \Re e(s_3) \\ \Im m(s_3) \end{bmatrix} \right\| \quad [13]$$

With this transformation from a complex computation to a real value computation, the tree visualization described previously will have to expand to twice the number of levels. But each level only represents a decision over 1 dimension (either real or imaginary) of a signal constellation. Hence the number of branches originating from each node is the square root of the number of branches in the complex-valued case. Note that there are 6 levels instead of 3 in FIG. 2 because of the complex to real value transformation.

The root node 106 shown in FIG. 2 is initialized with a PED value of 0. The branches 107, 125, 126 and 127 from the node 106 represents the 4 possible imaginary value of symbol $s_3$, which is −1, 1 −3 and 3 respectively. The branches on node 108 represent the 4 possible real value of symbol $s_3$, which is −3, −1, 1 and 3 from left to right respectively. Similar to node 106, branches of node 110 and 114 are imaginary component of the symbol $s_2$ and $s_1$ respectively. Similar to node 108, branches of node 112 and 116 are real component of the symbol $s_2$ and $s_1$ respectively.

The branch 107 computes the $e_{i3}^2$ of the symbol $s_3$ with the imaginary part of value 3. The resulting new PED is $0+e_{i3}^2$ as shown in child node 108. The branch 109 computes the $e_{r3}^2$ of the symbol $s_3$ with the real part of value 3. The resulting PED is $T(s_3)=e_{i3}^2+e_{r3}^2$ as shown in node 110. The branch 111 computes the $e_{i2}^2$ of the symbol $s^2$ with the imaginary part of value −1. The resulting new PED is $T(s_3)+e_{i2}^2$ as shown in child node 112. The branch 113 computes the $e_{r2}^2$ of the symbol $s_2$ with the real part of value −3. The resulting PED $T(s_2)=T(s_3)+e_{i2}^2+e_{r2}^2$ as shown in node 114.

Branch 107, 109, 111, 113, 115 and 117 represent one of the many possible results of the row by row computation of equation [13], where branch 107 represents the last row and branch 117 represents the first row of the equation. Branch 107 thus equals $e_{ik}^2$ of equation [12] for k=3, and branch 117 equals $e_{rk}^2$ of equation [12] for k=1. The intermediate branches 109, 111, 113, and 115 equal to $e_{rk}^2$ for k=3, $e_{ik}^2$ and $e_{rk}^2$ for k=2 and $e_{ik}^2$ for k=1 respectively. To compute the output of step 102, which consists of all possible $s^{<2>}$ with their respective $T(s^{<2>})$ value, it is necessary to process all nodes and branches of the tree up to all nodes at the same level as node 114.

The sum of the $e_{ik}^2$ and $e_{rk}^2$ of branch 107, 109, 111, 113, 115 and 117 is the $T(s^{<1>})$ or d(s). Since the tree has 6 real valued levels and each node branches out to 4 other paths (due to the 4 discrete level on each of the I and Q channel), there are a total of $4^6$ (=4096) independent d(s), one for each possible vector $\{s_1,s_2,s_3\}$. Finding all the 4096 d(s) is thus requires a full search algorithm. Our invention avoids the complexity of performing a full search by identifying and computing a partial set of relevant d(s) and excludes the computation of the rest of the d(s), which have no influence on the final max-log ML solution, equation [5]. Therefore, the proposed invention results in no loss in performance comparing to the full search method.

Figures 3, 4, 5:
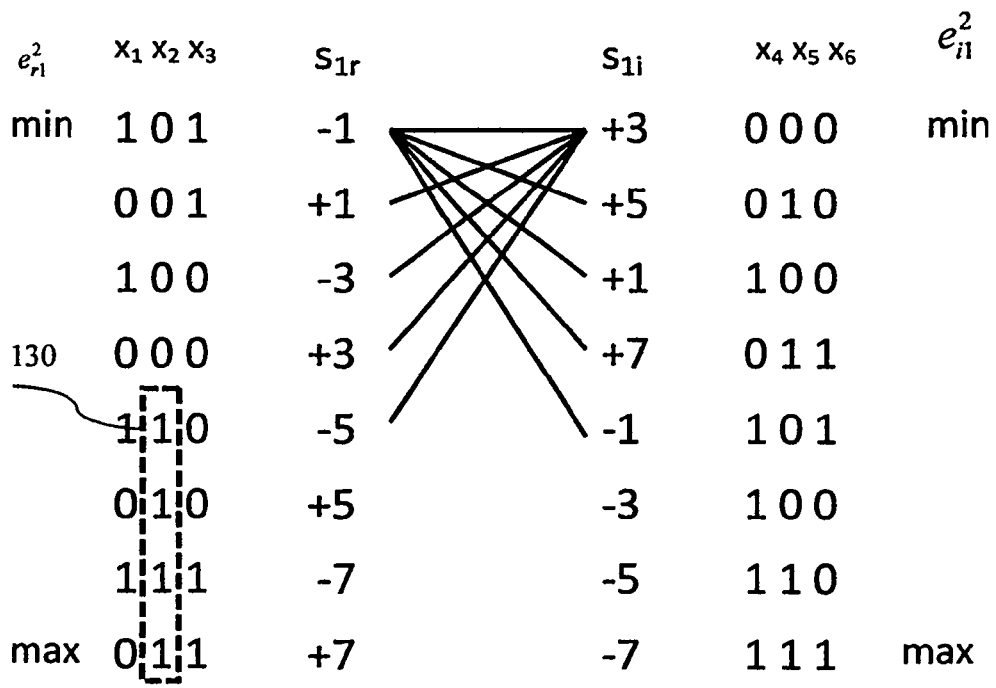
FIG. 3 is a table showing an example of sorting the incremental partial error of 16-QAM.
FIG. 4 is a table showing an example of sorting the incremental partial error of 64-QAM.
FIG. 5 illustrates the combination between $s_{r1}$ and $s_{i1}$ investigated by SFS algorithm for a particular partial symbol vector $s^{<2>}$ with 64-QAM modulation.

To determine the set of relevant d(s), the imaginary branches emitting from each $s^{<2>}$ node (that is all nodes at the same level as node 114) are arranged according to the ascending order of their incremental error distance $e_{i1}^2$. Similarly, the real branches emiting from nodes at the same level as node 116 are arranged according to the ascending order of their incremental error distance $e_{r1}^2$. This operation corresponds to the third step (step 103), as shown in FIG. 1. By setting $s_{rk}$ and $s_{ik}$, where k=1, of equation [12] to $u_{rk}/a_{k,k}$ and $u_{ik}/a_{k,k}$ respectively, $e_{rk}$ and $e_{ik}$ becomes zero. These solutions $s_{rz}=u_{rk}/a_{k,k}$ and $s_{iz}=u_{ik}/a_{k,k}$ can be used to sort the $s^{<1>}$ nodes (nodes at same level as node 118) in ascending order of the incremental error distances by comparing the solution with some thresholds values and use the result of the comparison as a select signal for a look-up table. An example of this sorting method for 16 QAM is shown in FIG. 3. FIG. 4 shows an example of the sorting method when applied to 64 QAM symbols. Notice that this sorting is done without computing and comparing any actual pair of incremental error values.

Since the sorting imaginary branches is independent of the real branches, and vice versa, both sorts can be computed in parallel.

As shown in FIG. 1, the fourth step (step 104), consists of computing the d(s) value that are relevant for the max-log-ML calculation. As it has been shown above, Step 104 uses the information of the ascending $e_{rk}^2$ and $e_{ik}^2$ order of the real and imaginary branches of a $s^{<2>}$ node to determine which s vectors originated from this node will have its d(s) value calculated. Hence, after the sorting, the branches emitting from node 114 and other nodes of the same level are sorted from left to right in ascending order. As an example, branches 115, 122, 123 and 124 are in ascending order of $e_{i1}^2$ for the 4 imaginary values of symbol $s_1$ and branches 117, 119, 120 and 121 are in ascending order of $e_{r1}^2$ for the 4 real values of the symbol $s_1$.

In general, the hypothesis for s that will survive the tree pruning in level k=1 are those that maps to a vector x that fit in at least one $B_k$ set. This can be expressed with the equation $$\bar{s} \rightarrow x \in \bigcup_{k=1}^{MU} B_k$$

where $\bar{s}$ is a surviving vector s.

To explain the rules that define the sets $B_1, B_2, \ldots, B_{MU}$ it is first necessary to determine which bits from x maps to $s_{r1}$, $S_{i1}$ and $s^{<2>}$. The U bits that maps to a complex symbol in vector s can be divided in bits that maps the real part and bits that maps the imaginary part of that symbol. Thus, let's consider that bits $x_1, \ldots, x_{U/2}$ maps to symbol $s_{r1}$ and bits $x_{U/2+1}, \ldots, x_U$ maps to symbol $s_{i1}$, while the others bits, $x_{U+1}, x_{U+2}, \ldots, x_{MU}$, map to the partial symbol vector $s^{<2>}$. Notice that a set of $$2^{\frac{U}{2}-1}+1$$

symbols $s_{r1}$ (more than half of the possibilities) always covers all the individual bit values possible for bits $x_1, \ldots, x_{U/2}$. The same thing is valid for a set of $$2^{\frac{U}{2}-1}+1$$

symbols $s_{i1}$ and bits $x_{U/2+1}, \ldots, x_U$. This property along with the property described by $$d(s)=T(s^{<2>})+e_{r1}(s^{<2>},s_{r1})^2+e_{i1}(s^{<2>},s_{i1})^2, \quad [14]$$

which results from equation [9] and [12], allows the sets $B_1$ to $B_{MU}$ be constricted by the following rules. These rules forms the core algorithm in the SFS algorithm.

For $B_{U+1}, B_{U+2}, \ldots, B_{MU}$, only the combination between the $s_{r1}$, with the smallest $e_{r1}^2$, and the $s_{i1}$, with the smallest $e_{i1}^2$, for each $s^{<2>}$ node is included. Other hypothesis for $s_1$ increases $e_{r1}^2+e_{i1}^2$ and, consequently, do not result in the optimum d(s) for any of the bit, $x_{U+1}, \ldots, x_{MU}$, related to $s^{<2>}$.

For $B_1, \ldots, B_{U/2}$, only the combination between the $s_{r1}$, associated with the first $$2^{\frac{U}{2}-1}+1$$

$e_{r1}^2$ arranged in ascending order, and the $s_{i1}$, with the smallest $e_{i1}^2$, for each $s^{<2>}$ are included. If less than $$2^{\frac{U}{2}-1}+1$$

possibilites for $s_{r1}$ were used, some bit value possibility for bit $x_1$ to $x_{U/2}$ could be missed. Other hypothesis for $s_{r1}$ and $s_{i1}$ increase d(s) and do not introduce any new possibility for bits, $x_1, \ldots, x_{U/2}$, related to $s_{r1}$.

For $B_{U/2+1}, \ldots, B_U$, only the $s_{r1}$, with the smallest $e_{r1}^2$, and the $s_{i1}$, associated with the first $2^{U/2-1}+1 e_{r1}^2$ arranged in ascending order, for each $s^{<2>}$ are included, due the same logic explained above.

The s vectors that fit in one of the above 3 rules are the surviving leafs of the tree pruning, and have their correspondent d(s) value calculated using equation [14]. Since $T(s^{<2>})$ value was previously computed in step 102, only $e_{r1}(s^{<2>}, s_{r1})^2$ and $e_{i1}(s^{<2>}, s_{i1})^2$ of the surviving leafs need to be computed before processing equation [14]. The output of step 104 is a set of surviving hypotheses for s, which map to a set of bit vectors x, with their associated d(s) value.

Figures 6, 7:
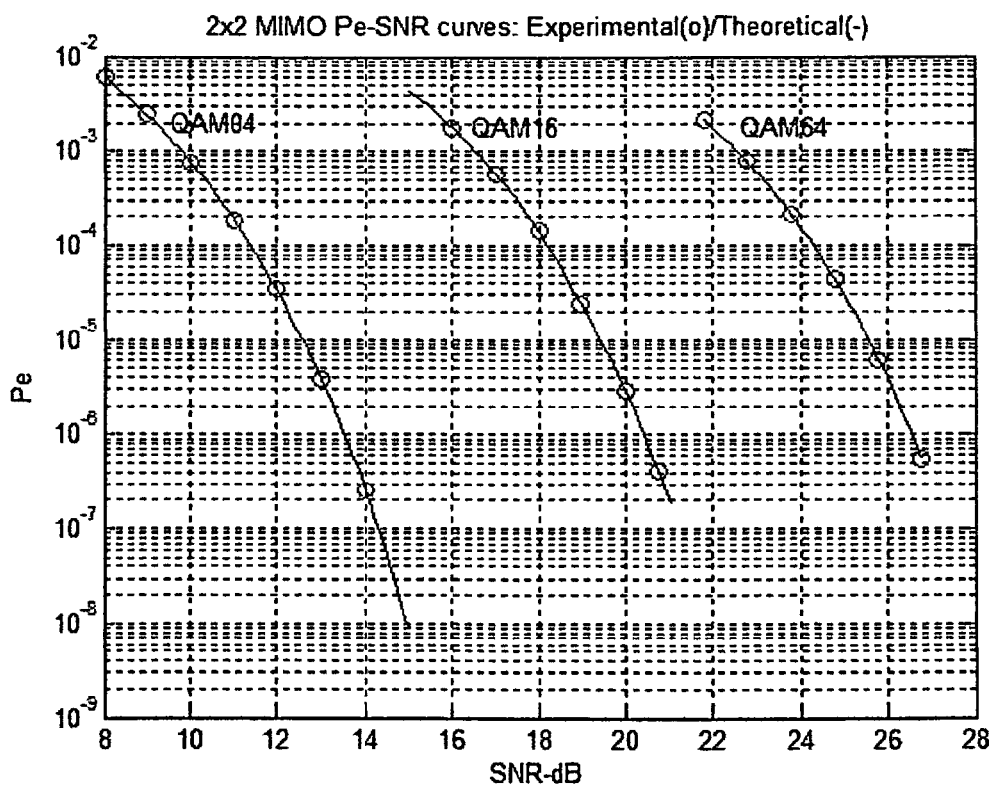
FIG. 6 illustrates the combination between $s_{r1}$ and $s_{i1}$ investigated by SFS algorithm for a particular partial symbol vector $s^{<2>}$ with 16-QAM modulation.
FIG. 7 shows a 2×2 MIMO Pe vs SNR curve, comparing experimental and theoretical values.

FIG. 5 illustrates the SFS selection rule for the case of a QAM64 transmission where the $s_{r1}$ and $s_{i1}$ branches from a particular $s^{<2>}$ vector have been sorted in ascending $e_{r1}^2$ and $e_{i1}^2$ order, with the smallest value at the top of the table. The lines between $s_{r1}$ and $s_{i1}$ symbols show the combinations between these symbols that are evaluated by the SFS algorithm. Notice that, the top 5 combinations, resulting in the 5 smallest sum of $e_{r1}^2$ and $e_{i1}^2$, would cover all the bit values for $s_{r1}$ and $s_{i1}$. If, for instance, only the top 4 combinations are selected, there would not be any combination that would cover $x_2=+1$ (dashed box 130 in FIG. 5). FIG. 6 shows a similar example for QAM16, where the top 3 combinations would cover all the bits of $s_{r1}$ and $s_{i1}$. If, for instance, only the top 2 combinations are chosen, then $x_2=+1$ and $x_3=+1$, for this particular $s^{<2>}$ value, would not be covered.

The reduction of paths (tree prunning) exiting a $s^{<2>}$ node, done by the SFS algorithm, can be visualized using the search tree for the 3×3 16QAM example shown previously in FIG. 2. For illustration purpose, the d(s) value of branch 115 and 117, branch 115 and 119, and branch 115 and 120 would correspond to the combinations 131, 132 and 133 on FIG. 6. Similarly, only d(s) value of branch 122 and 128, and branch 123 and 129 are computed to cover the combination 134 and 135 on FIG. 6. These combinations would be sufficient to cover all the bits that would map to the symbol vector s. The d(s) values of the other branches emitting from the node 114 and 116 would not be calculated.

As shown in FIG. 1, the fifth step (step 105) computes the ML for each bit in x using the set of x and associated d(s) values obtained in step 104. This is done by computing Equation [6], for each bit in x. The min0 operation can be computed by setting the first value to be investigate as the initial current min value and then sequentially compare each one of the remaining values to be investigated with the current min value, updating the current min when needed. Therefore, the total number of comparisons needed to solve a min operation is equal to $B_k$ size.

According to what was stated, the total number of d(s) needed to compute the ML for all transmitted bits can be reduced from $$2^{M \cdot U} \text{ to } 2^{(M-1)U} \cdot \left(2^{\frac{U}{2}} + 1\right).$$

Moreover, the number of d(s) values comparizon to get the ML hypothesis for $x_k = +1$ and $x_k = -1$ is reduced from $2^{M \cdot U}$ to $2^{(M-1)U}$, for bits $x_{U+1}$ to $x_{MU}$, and to $2^{(M-1)U} \cdot (2^{U/2-1} + 1)$ for bits $x_1$ to $x_U$. Thus, the total number of comparison is $$U \cdot 2^{(M-1)U} \left(M + 2^{\frac{U}{2}}\right).$$

The major advantge of this inventive algorithm is that it can reduce MIMO max-log ML, and other aproximation of the ML, computational complexity by about 86%, 69% and 25% for QAM64, QAM16 and QAM4 respectively, without introducing any performance degradation. This characteristics is verified by the simulation results shown in FIG. 7. The experimental results are indicated by circle falling on the theoretical curve line.

The invention claimed is:

1. A MIMO (multiple input, multiple output) detector, comprising:
   at least one processor; and
   at least one non-transitory memory including computer program code for one or more programs,
   the at least one non-transitory memory and the computer program code configured to, with the at least one processor, cause the MIMO detector to perform an optimized search algorithm, called simplified full search (SFS), to identify the surviving hypothesis vectors s of a transmitted symbol vector and a resulting Euclidean Distance (ED), d(s), the surviving hypothesis vectors s can be used to compute the max-log-ML log-likelihood-ratio (LLR) for all bits of the transmitted symbol vector, by the computations of all possible Partial Euclidean Distance (PED) $s^{<2>}$ vectors, sorting the real part $S_{r1}$ and the imaginary part $S_{i1}$ of each PED $s^{<2>}$ vector in the ascending order of their respective incremental errors, selection of a group of surviving hypothesis vectors s based on SFS rules, and computations of d(s) of the surviving hypothesis vectors s, given that all incremental errors, $\|e_k(s^{<k>})\|^2$, up to last but one level of a complex search tree, formed by a channel estimate H and a received symbol y, are known.

2. The MIMO detector according to claim 1, wherein said incremental errors are used to compute all the Partial Euclidean Distances (PEDs) by computing groups of PED for $s^{<k-1>}$ by summing a PED $s^{<k>}$ with each of its possible incremental errors, $\|e_k(s^{<k>})\|^2$, for all $s^{<k>}$ where k=N+1 down to k=2.

3. The MIMO detector according to claim 1, wherein said optimized algorithm SFS sorts the real part $S_{r1}$ and the imaginary part $S_{i1}$ of each PED $s^{<2>}$ vector by arranging the real part $S_{r1}$ and the imaginary part $S_{i1}$ of each PED $s^{<2>}$ vector in ascending order of their respective incremental errors; (ascending incremental order) by computing the solutions $s_{rz} = u_{rk}/a_{k,k}$ and $s_{iz} = u_{ik}/a_{k,k}$, for k=1, where $a_{k,k}$ is diagonal matrix element obtained by QR factorization of the channel matrix H, and $u_{r,k}$ and $u_{i,k}$ are the real and imaginary part of the scalar product between the vector $[r_{k,k+1}, r_{k,k+2}, \ldots, r_{k,M}]$ and $[s_{k+1}, s_{k+2}, \ldots, s_M]$, where $r_{l,c}$ is the complex element in row l and column c from matrix R, wherein the matrix R is the upper triangular matrix resulted from the QR factorization of the channel matrix H, and $s_l$ is the l-th element from s, comparing these solutions, $s_{rz}$ and $s_{iz}$ to threshold values, and finding the ascending order based on the comparisons from a lookup table.

4. The MIMO detector according to claim 1, wherein said selection of the group of surviving hypothesis vectors s further selects a set of surviving hypothesis vectors s based on SFS rules from the sorted real part $S_{r1}$ and imaginary part $S_{i1}$ and computes the d(s) of these surviving hypothesis vectors s.

5. The MIMO detector according to claim 4, wherein based on the SFS rules, selecting a set of surviving hypothesis vectors s, where each surviving hypothesis vector is associated with one of the element in the set of hypothesis bit sequences $B_1$ to $B_{MU}$, where M is the number of transmit antenna and U is the number of bits in each QAM symbol, by
   associating the $B_{U+1}, B_{U+2}, \ldots, B_{MU}$ subsets only with s vectors that has $s_{r1}$, with the smallest $e_{r1}^2$, and $s_{i1}$, with the smallest $e_{i1}^2$;
   associating the $B_1, \ldots, B_{U/2}$ subsets only with s vectors that has $s_{r1}$, associated with the first $$2^{\frac{U}{2}-1} + 1 e_{r1}^2$$

arranged in ascending order, and $s_{i1}$, with the smallest $e_{i1}^2$;
   and associating $B_{U/2+1}, \ldots, B_U$ subsets only with s vectors that has $s_{r1}$, with the smallest $e_{r1}^2$, and $s_{i1}$, associated with the first $2^{U/2-1} + 1$ $e_{r1}^2$ arranged in ascending order (where $e_{r1}$ and $e_{i1}$ is the real and imaginary part of the incremental error at level 1 and, $s_{r1}$ and $s_{i1}$ are the real and imaginary part of $s_1$).

6. The MIMO detector according to claim 5, wherein the d(s) of the surviving hypothesis vector s associated with the set of bit sequence $B_k$ is used to compute the max-log-ML LLR for bit k.

* * * * *